United States Patent
Fitzgerald et al.

(10) Patent No.: US 6,862,953 B2
(45) Date of Patent: *Mar. 8, 2005

(54) MODULAR BI-DIRECTIONAL CLUTCH ASSEMBLY

(75) Inventors: Brian M. Fitzgerald, Cazenovia, NY (US); Douglas W. Conklin, Oneida, NY (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/626,100

(22) Filed: Jul. 24, 2003

(65) Prior Publication Data

US 2004/0168545 A1 Sep. 2, 2004

Related U.S. Application Data

(63) Continuation-in-part of application No. 10/080,420, filed on Feb. 22, 2002, now Pat. No. 6,629,474.
(60) Provisional application No. 60/287,155, filed on Apr. 27, 2001.

(51) Int. Cl.[7] .............................................. F16H 37/06
(52) U.S. Cl. ................ 74/665 G; 74/665 GE; 74/665 T; 180/248; 180/249; 180/251; 192/38; 192/44; 192/47; 192/54.2; 475/223; 475/295; 475/320
(58) Field of Search .................... 475/295, 320, 475/223; 74/665 GE, 665 G, 665 T; 180/248, 249, 251; 192/38, 44, 47, 54.2

(56) References Cited

U.S. PATENT DOCUMENTS

| | | | |
|---|---|---|---|
| 4,132,297 A | 1/1979 | Brown et al. | |
| 4,874,056 A | 10/1989 | Naito | |
| 5,363,938 A | 11/1994 | Wilson et al. | |
| 5,407,024 A | 4/1995 | Watson et al. | |
| 5,520,590 A | 5/1996 | Showalter et al. | |
| 5,704,863 A | 1/1998 | Zalewski et al. | |
| 5,924,510 A | 7/1999 | Itoh et al. | |
| 5,937,980 A | 8/1999 | Dick | |
| 5,951,428 A | 9/1999 | Itoh et al. | |
| 5,992,592 A | 11/1999 | Showalter | |
| 5,993,592 A | 11/1999 | Perego | |
| 6,092,635 A | 7/2000 | McCarthy et al. | |
| 6,123,183 A | 9/2000 | Ito et al. | |
| 6,132,332 A | 10/2000 | Yasui | |
| 6,186,298 B1 | 2/2001 | Wake | |
| 6,263,995 B1 | 7/2001 | Watson et al. | |
| 6,367,604 B1 | 4/2002 | Kerr | |
| 6,409,000 B1 | 6/2002 | Ioth et al. | |
| 6,409,001 B1 | 6/2002 | Kerr | |
| 6,629,474 B2 * | 10/2003 | Williams | 74/665 G |
| 6,652,407 B2 * | 11/2003 | Ronk et al. | 475/204 |
| 2004/0067812 A1 * | 4/2004 | Williams | 475/223 |

FOREIGN PATENT DOCUMENTS

GB     2081402 A     2/1982

* cited by examiner

Primary Examiner—Saul Rodriguez
Assistant Examiner—David D. Le
(74) Attorney, Agent, or Firm—Harness, Dickey & Pierce P.L.C.

(57) ABSTRACT

A controllable, multi-mode, bi-directional overrunning clutch assembly and a shift system are adapted for use in a power transmission device. The clutch assembly includes a first ring journalled on a first rotary member, a second ring fixed to a second rotary member, and a plurality of rollers disposed in opposed cam tracks formed between the first and second rings. The first ring is split to define an actuation channel having a pair of spaced end segments. An actuator ring is moveable between positions engaged with and released from the end segments of the first ring. The shift system includes a moveable clutch actuator which controls movement of the actuator ring for establishing engaged and disengaged clutch modes. An alternate embodiment clutch assembly includes first and second rings non-rotatably coupled to one another. A third ring is selectively engageable with a rotary component to transfer power thereto.

35 Claims, 9 Drawing Sheets

MODULAR BI-DIRECTIONAL CLUTCH ASSEMBLY

CROSS-REFERENCE TO RELATED APPLICATIONS

This application is a continuation-in-part of U.S. Pat. Application No. 10/080,420 filed on Feb. 22, 2002, now U.S. Pat. No. 6,629,474, which claims the benefit of U.S. Provisional Application Ser. No. 60/287,155 filed on Apr. 27, 2001.

FIELD OF THE INVENTION

The present invention relates generally to bi-directional overrunning clutch assemblies and, more particularly, to an actively-controlled, multi-mode, bi-directional overrunning clutch assembly used in a four-wheel drive transfer case.

BACKGROUND OF THE INVENTION

Four-wheel drive vehicles are in great demand due to the enhanced on and off road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a more sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically, in response to lost traction of the primary driveline. An example of passively-controlled on-demand transfer case is shown in U.S. Pat. Nos. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled on-demand clutch control systems, recent efforts have been directed to the use of overrunning clutches that can be controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly that is noted to be operable for use in vehicular power transmission mechanisms. Likewise, U.S. Pat. Nos. 5,924,510, 5,951,428, 6,123,183, and 6,132,332 each disclose a controllable multi-mode overrunning clutch installed in a transfer case and which is actuated using an electromagnetic clutch. Accordingly, a need exists to continue development of controllable bi-directional overrunning clutch assemblies which provide improved structure, robust operation, and reduced packaging for use in on-demand transfer cases.

SUMMARY OF THE INVENTION

The present invention is directed to a controllable, multi-mode, bi-directional overrunning clutch assembly and a shift system adapted for use in a transfer case for transferring drive torque from a primary output shaft to a secondary output shaft so as to establish a four-wheel drive mode. The clutch assembly includes a first ring journalled on a first rotary member, a second ring fixed to a second rotary member, and a plurality of rollers disposed in opposed cam tracks formed between the first and second rings. The first ring is split to define an actuation channel having a pair of spaced end segments. An actuator ring is moveable between positions engaged with and released from the end segments of the first ring. The shift system includes a moveable clutch actuator which controls movement of the actuator ring for establishing an on-demand four-wheel drive mode and a locked or part-time four-wheel drive mode.

The transfer case of the present invention also includes a two-speed gearset and a range sleeve that is moveable for establishing high and low-range drive connections. In such two-speed transfer cases, the shift system also functions to coordinate movement of the clutch actuator and the range sleeve to establish various combinations of speed ranges and drive modes.

In accordance with one embodiment of the present invention, the first ring is journalled on the secondary output shaft and the second ring is fixed to a rotary component of a transfer assembly driven by the primary output shaft. Thus, the invention provides for installing the controllable, multi-mode, bi-directional overrunning clutch in association with the front output shaft to permit significant axial length reductions for the transfer case.

In another embodiment, a first ring is driven by a first rotary component, a second selectively sizable ring is non-rotatably coupled to the first ring and a third split ring is journalled to a second rotary component. A plurality of rollers are disposed within cam tracks formed in both the second and third rings. A modular construction is provided where the complex cam tracks are formed on a more easily manufactured second ring instead of the first ring which typically includes a gear tooth profile.

Thus, it is an object of the present invention to provide an on-demand transfer case equipped with a controllable, multi-mode, bi-directional overrunning clutch that advances the state of the four-wheel drive technology.

It is a further object of the present invention to provide a power-operated actuator for controlling shifting of the clutch assembly between its distinct modes in response to mode signals received by a controller unit.

Further objects, advantages and features of the present invention will become readily apparent to those skilled in the art by studying the following description of the preferred embodiment in conjunction with the appended drawings which are intended to set forth the best mode currently contemplated for carrying out the present invention.

DETAILED DESCRIPTION OF THE PREFERRED EMBODIMENT

Figure 1:
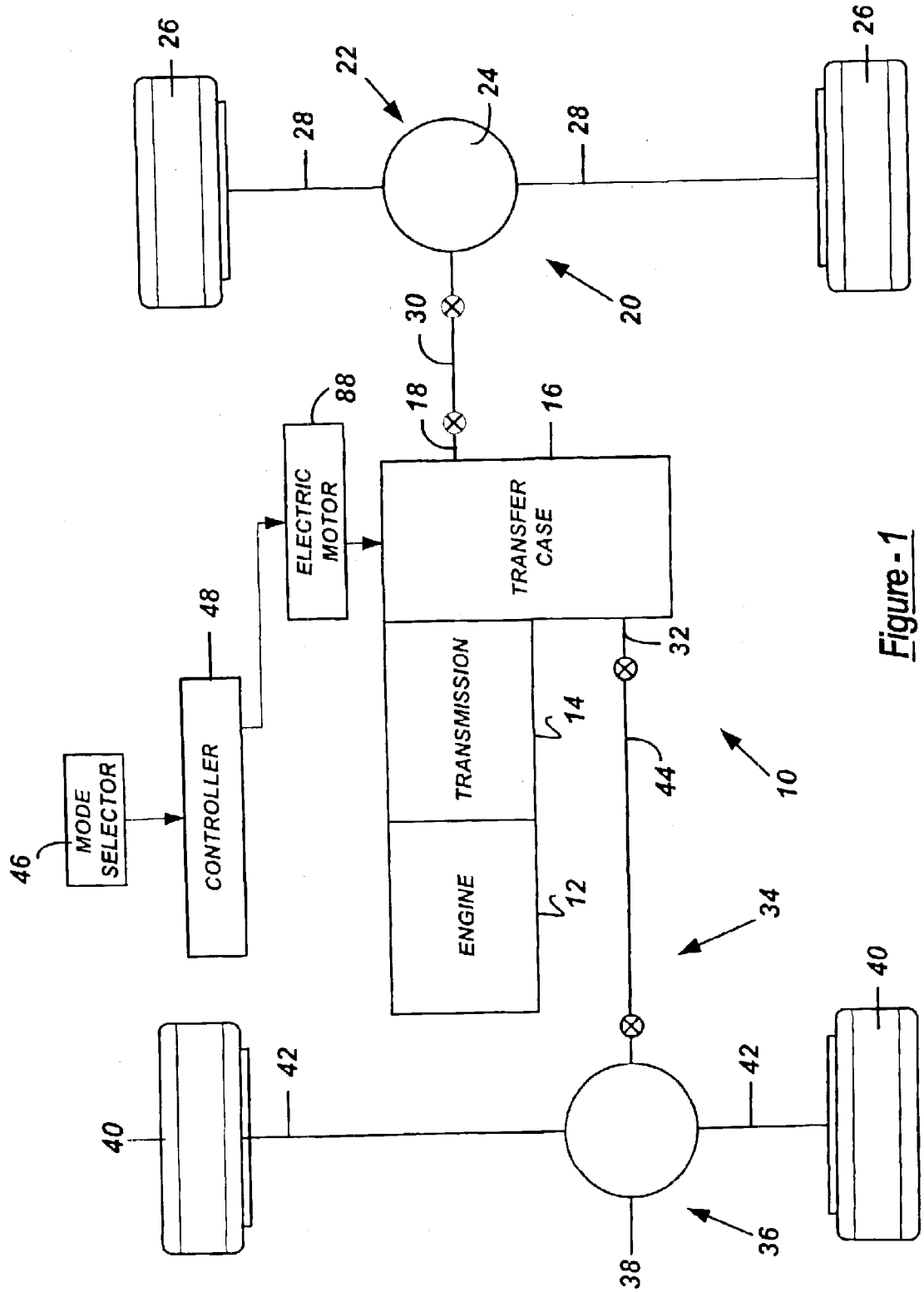
FIG. 1 is a schematic view of a four-wheel drive motor vehicle equipped with a transfer case constructed according to the present invention.

Referring now to FIG. 1, a drive system 10 for a four-wheel drive motor vehicle is shown to include a power source, such as engine 12, which drives a conventional transmission 14 of either the manually or automatically shifted type. The output shaft of transmission 14 drives an input member of a transfer case 16 which, in turn, delivers drive torque to a primary output shaft 18 that is operably connected to a primary driveline 20. Primary driveline 20 includes an axle assembly 22 having a differential 24 driving a first pair of wheel assemblies 26 via axleshafts 28, and a drive shaft 30 connected between primary output shaft 18 and differential 24. Transfer case 16 further includes a secondary output shaft 32 that is operably connected to a secondary driveline 34. Secondary driveline 34 includes an axle assembly 36 having a differential 38 driving a second pair of wheel assemblies 40 via axleshafts 42, and a driveshaft 44 connected between secondary output shaft 32 and differential 38.

Drive system 10 also includes an electronic controller 48 which receives mode signals from a mode selector 46. Controller 48 receives the mode signals and generates control signals that are used to actuate a controllable shift system associated with transfer case 16. According to the arrangement shown, primary driveline 20 is the rear driveline of a rear wheel drive vehicle while secondary driveline 34 is its front driveline. However, it will be understood that the teachings of the present invention could easily be adapted for use in a front wheel drive vehicle in which the front driveline would be designated as the primary driveline.

Figure 2:
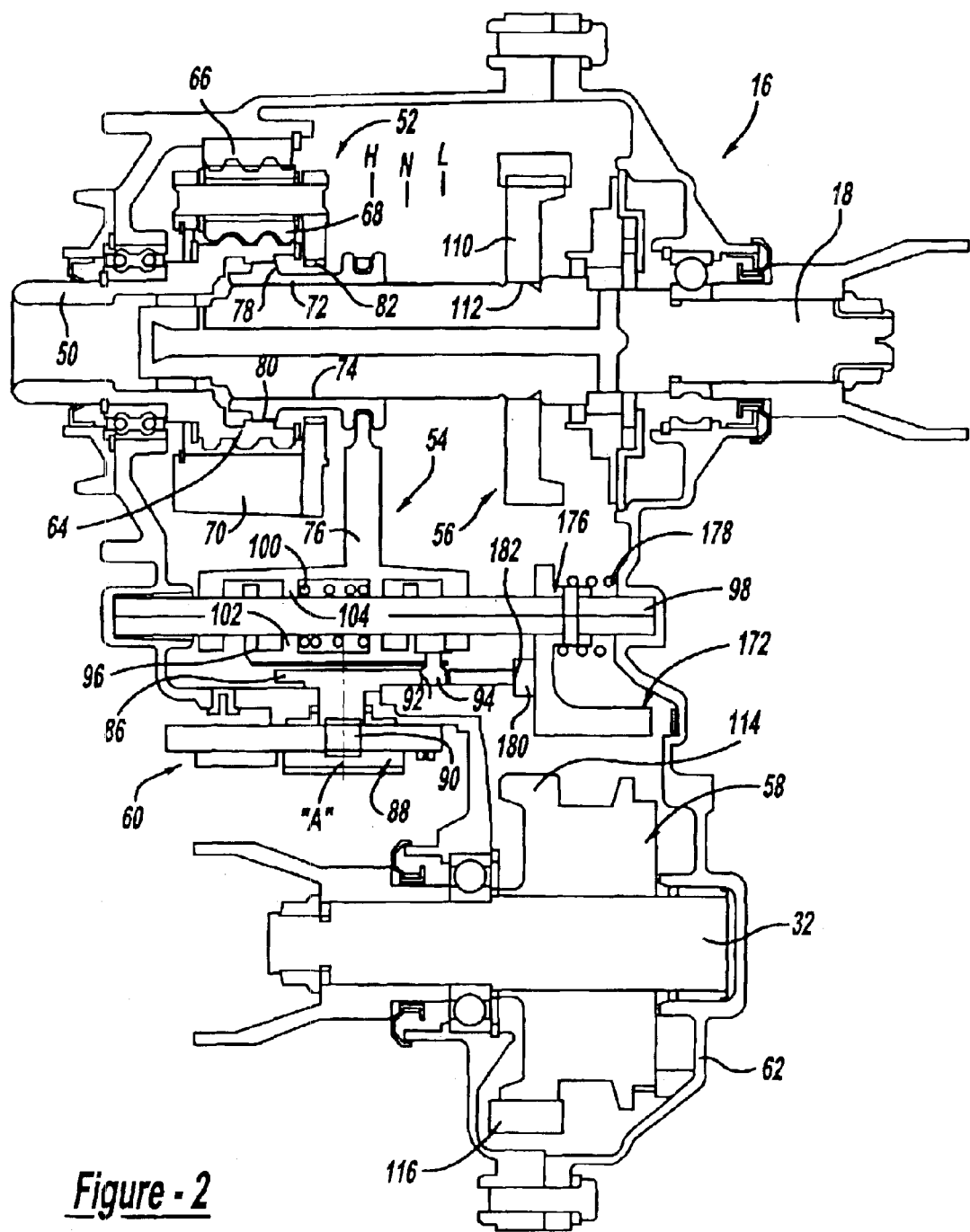
FIG. 2 is a sectional view of the transfer case equipped with a controllable, multi-mode, bi-directional overrunning clutch assembly and shift control system of the present invention.
Figure 3:
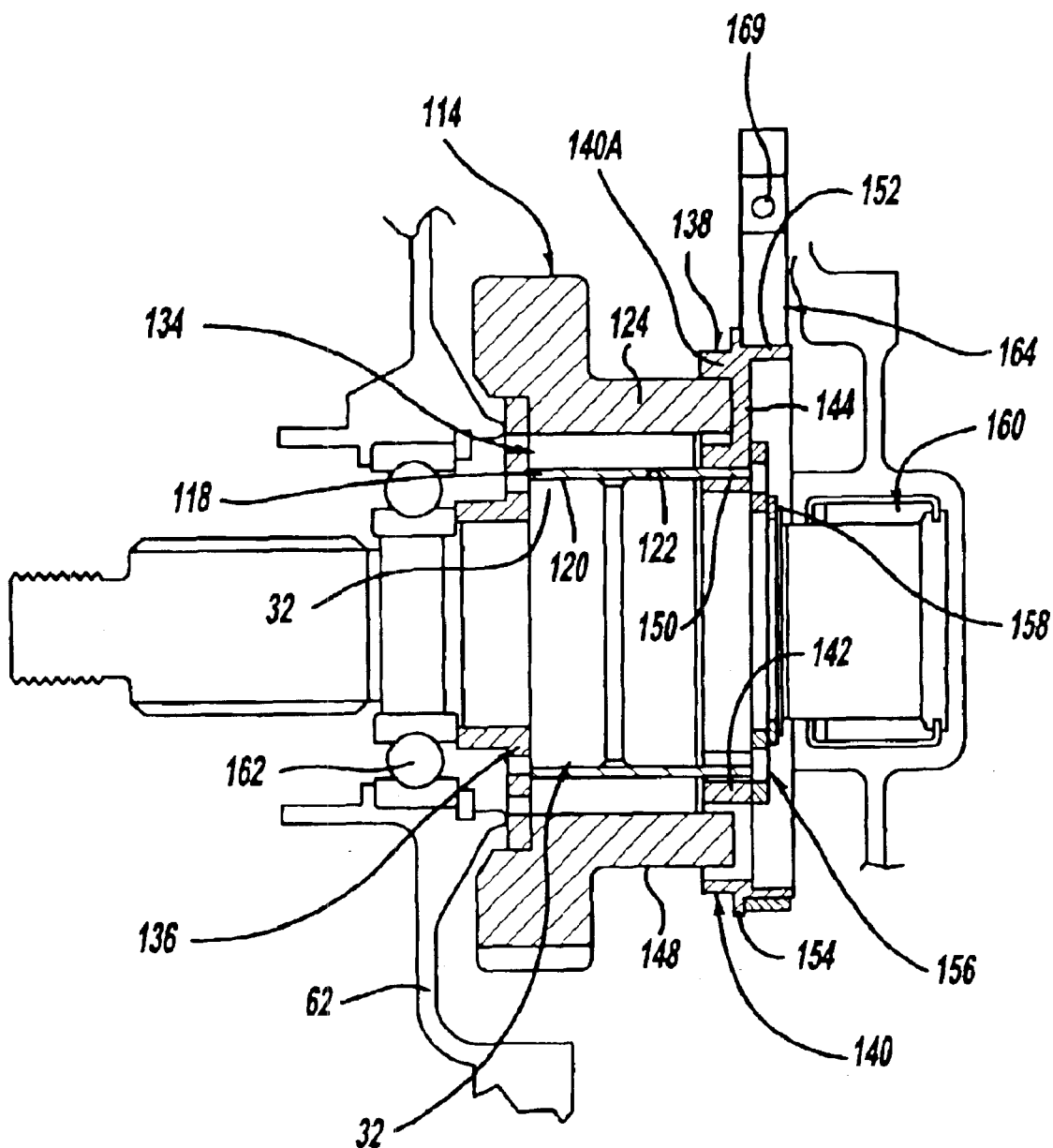
FIG. 3 is a sectional view of the bi-directional overrunning clutch assembly shown in FIG. 2.

Referring primarily to FIG. 2, transfer case 16 is shown to generally include an input shaft 50, rear output shaft 18, a planetary reduction gearset 52, a range clutch 54, front output shaft 32, a transfer assembly 56, a bi-directional mode clutch assembly 58, and a power-operated shift system 60, all of which are mounted to a housing assembly 62. Input shaft 50 is adapted for direct connection to the output shaft of transmission 14. Planetary gearset 52 includes a sun gear 64 fixed for rotation with input shaft 50, a ring gear 66 non-rotatably fixed to housing assembly 62, and a plurality of planet gears 68 rotatably supported on a planet carrier 70. Range clutch 54 includes a range collar 72 that is fixed via a splined connection 74 for rotation with and axial bi-directional movement on rear output shaft 18. Range collar 72 is moveable between a high-range (H) position, a neutral (N) position, and a low-range (L) position via axial translation of a range fork 76. In the H position, clutch teeth 78 on range collar 72 engage internal clutch teeth 80 on input shaft 50 so as to establish a direct ratio drive connection between input shaft 50 and rear output shaft 18. In the L position, clutch teeth 78 on range collar 72 engage internal clutch teeth 82 on planet carrier 70 so as to establish a reduction ratio drive connection such that rear output shaft 18 is driven at a reduced speed ratio relative to output shaft 18. In the N position, range collar 72 is disengaged from coupled engagement with both input shaft 50 and planet carrier 70 such that no drive torque is transmitted from input shaft 50 to rear output shaft 18.

The position of range collar 72 and range fork 76 are controlled by a sector plate 86 and a power-operated actuator, such as an electric motor/encoder assembly 88, that are associated with shift system 60. Sector plate 86 is rotated about an axis "A" by an output shaft 90 of motor assembly 88. Sector plate 86 has a contoured range slot 92 within which a follower pin 94 is retained. Follower pin 94 is fixed to a shift bracket 96 which is retained for sliding movement on a shift rail 98 that is fixed to housing assembly 62. Range fork 76 has a C-shaped end section retained in an annular groove formed in range collar 72. A biasing spring 100 surrounds shift rail 98 and its opposite ends engage laterally-spaced pairs of lugs 102 and 104 formed respectively on bracket 96 and range fork 76. As will be detailed, the contour of range slot 92 is configured to axially translate bracket 96 in response to rotation of sector plate 86. Spring 100 functions as a resilient energy storage coupling between bracket 96 and range fork 76 that allows rapid and smooth engagement of clutch teeth 78 on range collar 72 with the clutch teeth 80 on input shaft 50 and clutch teeth 82 on planet carrier 70 after a "block out" condition has been eliminated to complete the selected range shift.

It will be appreciated that planetary reduction gearset 52, range collar 72, range fork 76 and its corresponding connection to sector plate 86, which function to provide a two-speed (i.e., high-range and low-range) capability to transfer case 16 are optional such that transfer case 16 could be functional as a one-speed direct drive unit equipped only with mode clutch assembly 58. Moreover, the non-synchronized range shift system disclosed could alternatively be replaced with a synchronized range shift system to permit "on-the-move" shifting between high and low-range without the need to stop the vehicle. Commonly-owned U.S. Pat. Nos. 5,911,644, 5,957,429, and 6,056,666 disclose synchronized range shaft systems that are readily adapted for use with transfer case 16 and which are hereby incorporated by reference.

Transfer assembly 56 is driven by rear output shaft 18 and is shown to include a first sprocket 110 fixed via a splined connection 112 to rear output shaft 18, a second sprocket 114 rotatably mounted on front output shaft 32, and a power chain 116 meshed with both sprockets 110 and 114. Mode clutch assembly 58 is provided for selectively coupling second sprocket 114 to front output shaft 32 for transferring drive torque from rear output shaft 18 through transfer assembly 56 to front output shaft 32. Clutch assembly 58 is a controllable, multi-mode, bi-directional overrunning clutch installed between second sprocket 114 and front output shaft 32. Clutch assembly 58 includes an inner ring 118 having an inner surface 120 concentrically mounted on an outer surface 122 of front output shaft 32, and an outer ring 124 formed integrally as an axial hub extension of second sprocket 114. Inner ring, hereinafter referred to as slipper ring 118, is a split ring having an actuation slot 125 defining a pair of first and second end surfaces 126 and 128, respectively. A series of axially-extending arcuate cam tracks 130 are formed in an outer surface of slipper ring 118 while a corresponding plurality of axially-extending arcuate cam tracks 132 are formed in an inner surface of outer ring 124. A like plurality of elongated cylindrical rollers 134 are retained within aligned cam tracks 130 and 132.

Clutch assembly 58 also includes a front end cap 136 and a rear end cap 138 that are oriented to enclose and retain rollers 134 therebetween. Front end cap 136 has a plate segment that is fixed to sprocket 114 and an annular hub segment that is journalled on a portion of front output shaft 32. Rear end cap, hereinafter referred to as actuator ring 138, has a first cylindrical rim 140 and a second cylindrical rim 142 interconnected by a plurality of radial web segments 144 so as to define elongated arcuate cut-outs 146 therebetween. Second rim 142 is aligned with one end of rollers 134 while thickened portions 140A of first rim 140, which are aligned with web segments 144, are journalled on an outer surface 148 of outer ring 124. A radial lug 150 formed integrally with one of web segments 144 is retained in actuation slot 125 of slipper ring 118. Actuator ring 138 also includes a third cylindrical rim 152 extending rearwardly from a radial flange 154. Actuator ring 138 is preferably made from brass and is retained in its assembled position relative to front output shaft 32 via a thrust washer 156 and a snap ring 158. Bearing assemblies 160 and 162 are shown to rotatably support front output shaft 32 in housing 62.

Figure 7:
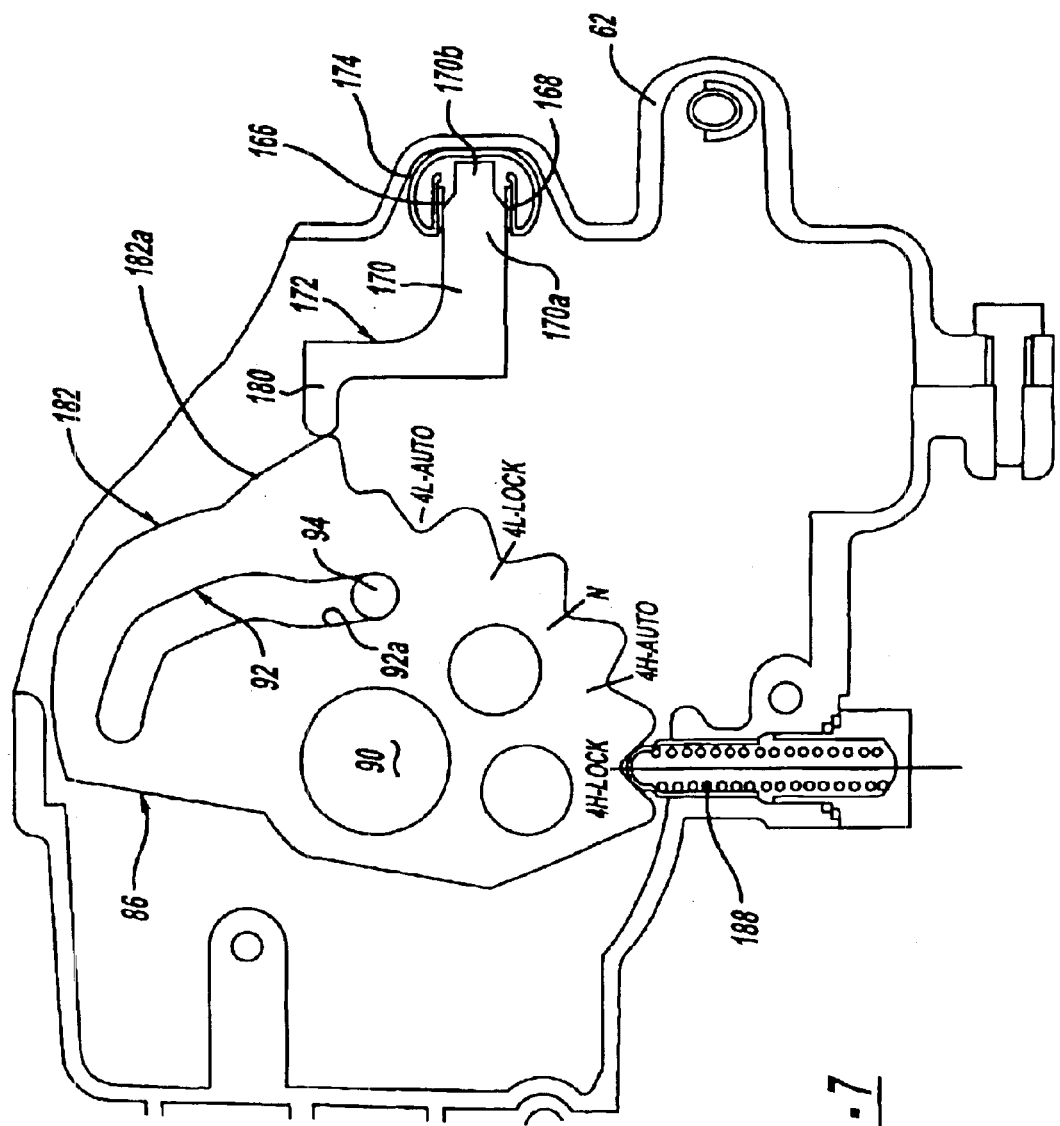
FIG. 7 is a partial sectional view of the transfer case showing components associated with the clutch actuator and the shift system operably located for establishing an on-demand four-wheel high-range drive mode.
Figure 8:
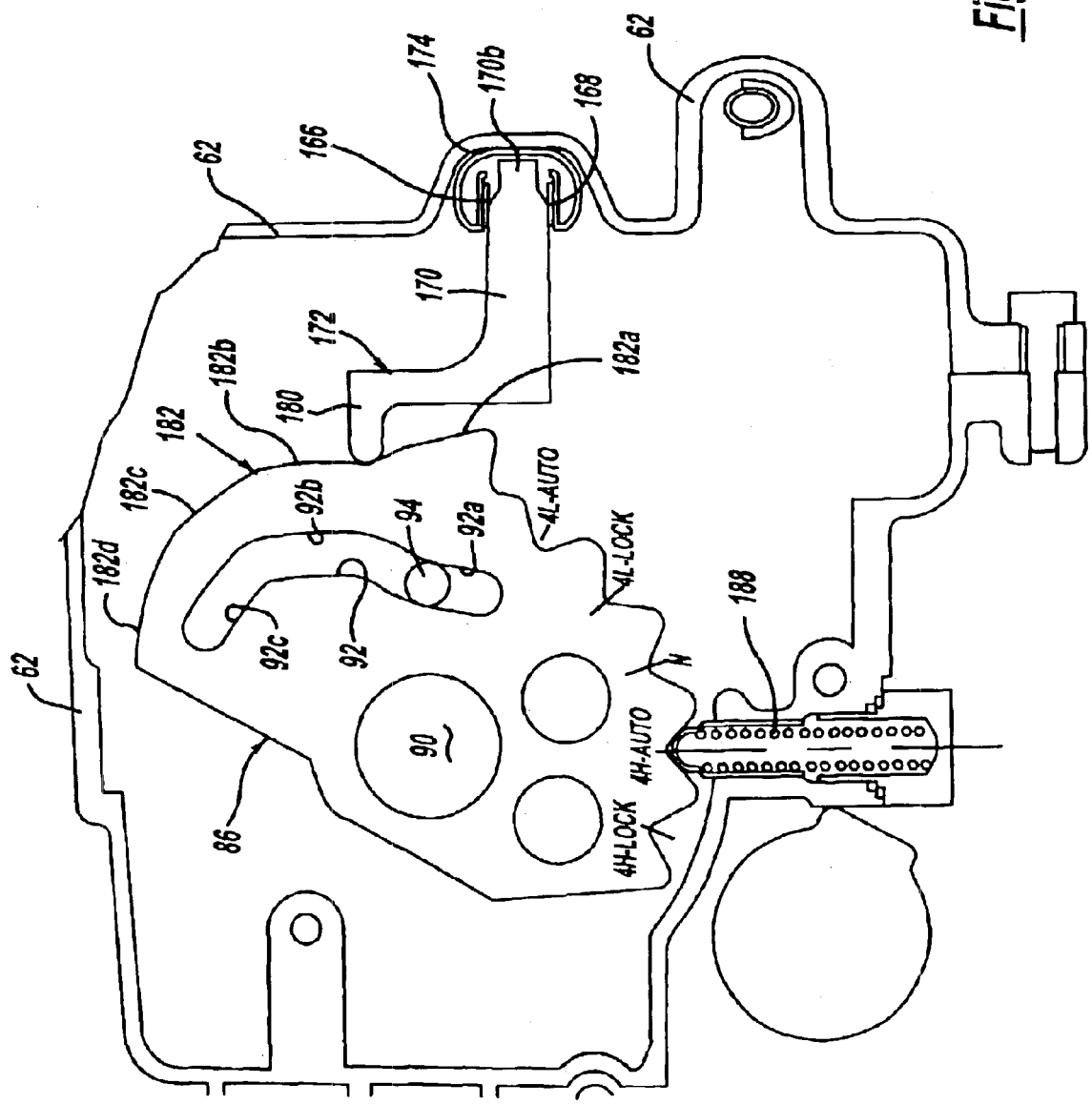
FIG. 8 is similar to FIG. 7 but shows the components operably located to establish a part-time four-wheel high-range drive mode.

Clutch assembly 58 further includes a drag band 164 shown which encircles third rim 152 of actuator ring 138 and which has a pair of ends 166 and 168 (see FIGS. 7 and 8). A roll pin 169 and a spring (not shown) interconnect ends 166 and 168 to ensure that drag band 164 normally maintains a predetermined drag force on third rim 152 of actuator ring 138. Drag band 164 is preferably made of brass or a suitable spring material.

Mode clutch assembly 58 is controlled by power-operated shift system 60 in response to the mode signal sent to controller 48 by mode selector 46. As will be detailed, sector plate 86 is rotated by electric motor assembly 88 to move a mode fork 172 for shifting mode clutch assembly 58 between an on-demand four-wheel drive mode and a locked or part-time four-wheel drive mode. As best seen from FIGS. 7 and 8, a cam rod segment 170 of mode fork 172 is disposed between ends 166 and 168 of drag band 164 and a circlip 174 is provided for biasing band ends 166 and 168 into contact with opposite edge surfaces of cam rod segment 170. Mode fork 172 is shown in FIG. 2 to include a cylindrical hub segment 176 that is journalled on shift rail 98 for axial bi-directional movement thereon. A return spring 178 surrounds shift rail 98 and acts between mode fork 172 and housing 62 for biasing a follower segment 180 of mode fork 172 into continuous engagement with a contoured camming edge 182 of sector plate 86. The contour of camming edge 182 functions to cause mode fork 172 to move between first and second mode positions in response to rotation of sector plate 86. Thus, rotation of sector plate 86 controls coordinated axial movement of range fork 76 and mode fork 172 to establish a plurality of distinct combinations of drive modes and speed ranges.

According to a preferred embodiment of the present invention, sector plate 86 may be rotated to any one of five distinct sector positions to establish a corresponding number of drive modes. These drive modes include a part-time four-wheel high-range drive mode, an on-demand four-wheel high-range drive mode, a neutral mode, a part-time four-wheel low-range drive mode, and an on-demand four-wheel low-range drive mode. The particular four-wheel drive mode selected is established by the position of mode fork 172 and range fork 76. In operation, the vehicle operator selects a desired drive mode via actuation of mode selector 46 which, in turn, sends a mode signal to controller 48 that is indicative of the particular drive mode selected. Thereafter, controller 48 generates an electric control signal that is applied to motor assembly 88 for controlling the rotated position of sector plate 86.

Mode selector 46 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode selector 46 offers, the vehicle operator the option of deliberately choosing between the various operative drive modes.

Referring again to FIGS. 7 and 8, sector plate 86 is shown to have five distinct detent positions labeled 4H-LOCK, 4H-AUTO, N, 4L-LOCK and 4L-AUTO. Each-detent position corresponds to an available drive mode that can be selected via mode selector 46. In particular, FIG. 7 illustrates a poppet assembly 188 retained in the 4H-LOCK detent of sector plate 86 which represents establishment of the part-time four-wheel high-range drive mode wherein range collar 72 is located in its H position and mode fork 172 is located in its first mode position. With mode fork 172 in its first mode position, the profile of a high-range segment 182a of camming edge 182 has forced cam rod segment 170 to move to a first position, in opposition to the biasing of spring 178. In this first position, ends 166 and 168 of drag band 164 have been forcibly separated so as to engage the side surfaces of a wider intermediate portion 170a of cam rod segment 170. Such separation of ends 166 and 168 of drag band 164 acts to release the circumferential drag force normally exerted on actuator ring 138.

Figure 4:
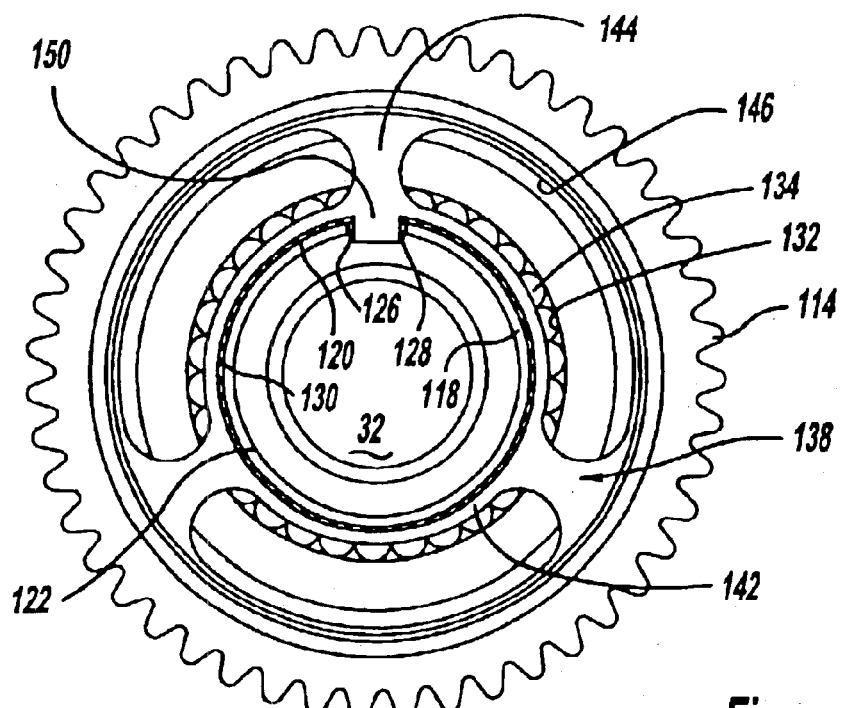
FIG. 4 is a rear end view of the bi-directional overrunning clutch assembly shown in FIG. 3.
Figure 5:
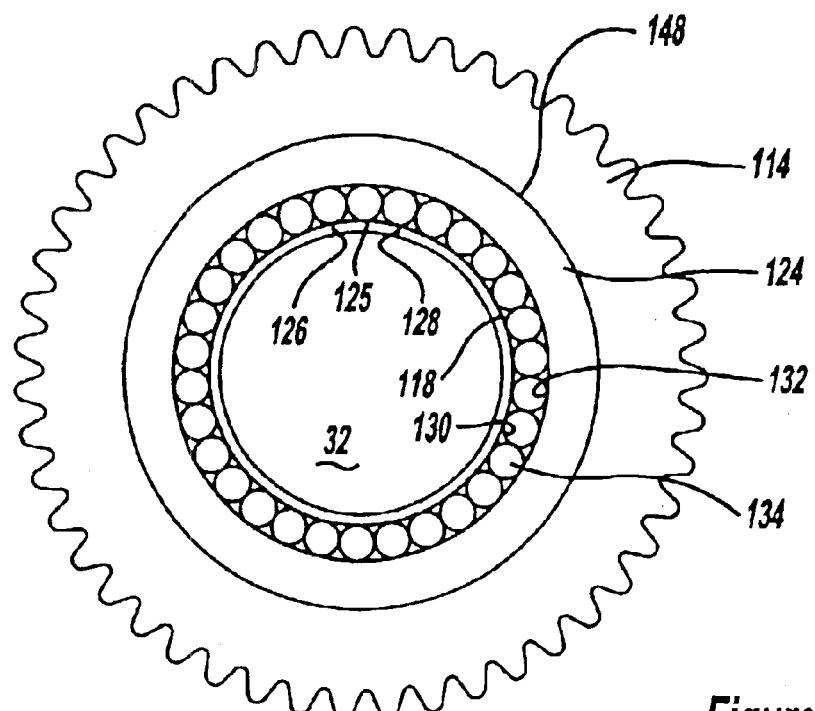
FIG. 5 is similar to FIG. 4 except that the actuator ring has been removed from the clutch assembly.
Figure 6:
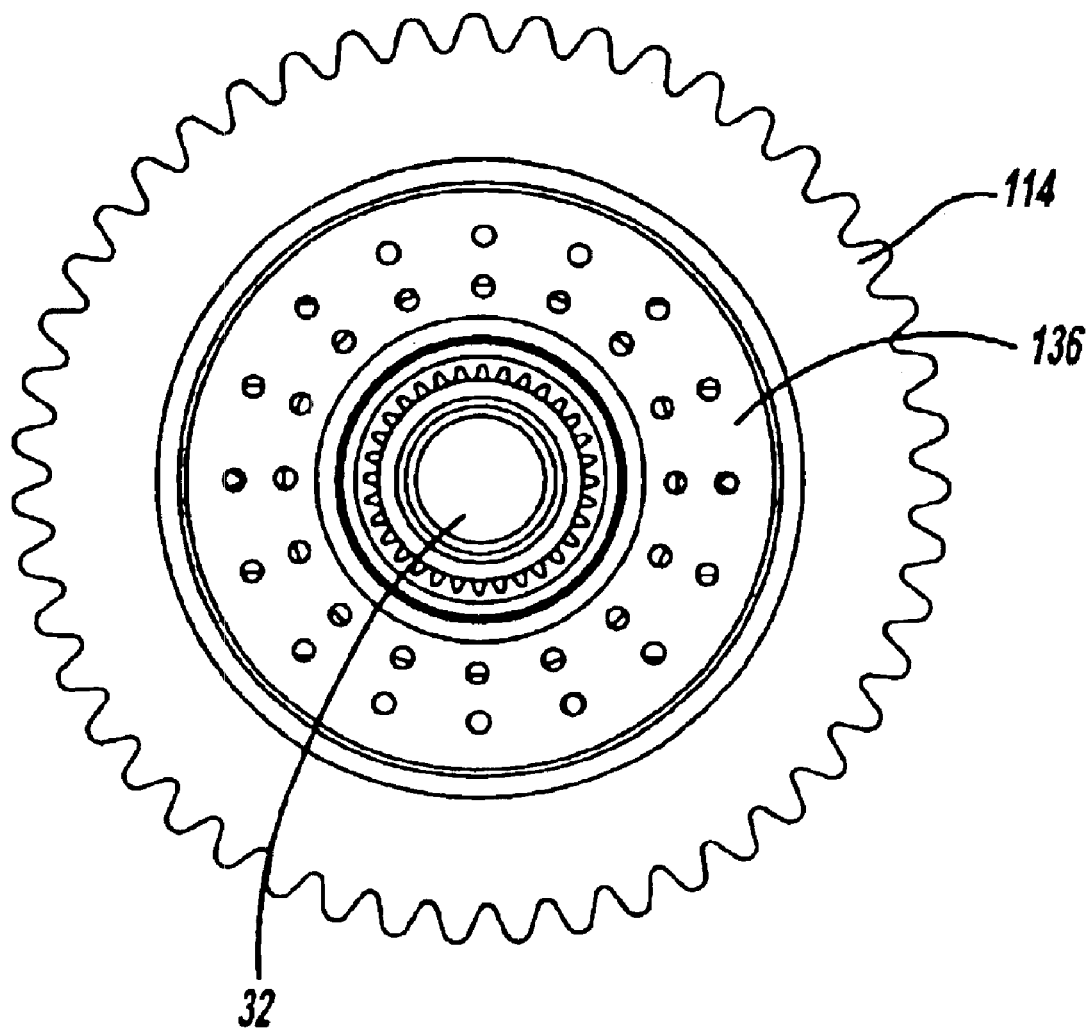
FIG. 6 is a front end view of the clutch assembly.

With drag band 164 released from frictional engagement with third rim 152 of actuator ring 138 due to movement of cam rod segment 170 to its first position, radial lug 150 is initially positioned centrally in actuation slot 125 of slipper ring 118, as shown in FIG. 4. When centrally located, the opposite edges of lug 150 are displaced from end surfaces 126 and 128 of actuation slot 125. As such, relative rotation between front output shaft 32 and rear output shaft 18 in either direction (i.e., front overrunning rear or rear overrunning front) causes a limited amount of relative rotation between slipper ring 118 and outer ring 124. Such limited relative movement causes rollers 134 to ride up the circumferentially indexed cam tracks 130 and 132 which, in turn, causes rollers 134 to exert a radially inwardly directed frictional locking force on slipper ring 118, thereby clamping inner surface 120 of slipper ring 118 to outer surface 122 of front output shaft 32. Accordingly, mode clutch assembly 58 is locked and second sprocket 114 is coupled to front output shaft 32 such that drive torque is transferred from rear output shaft 18 through transfer assembly 56 to front output shaft 32. In effect, front output shaft 32 is coupled to rear output shaft 18 to establish the part-time four-wheel drive mode.

Referring to FIG. 8, poppet assembly 188 is shown retained in the 4H-AUTO detent which represents establishment of the on-demand four-wheel high-range drive mode wherein range collar 72 is still located in its H position and mode fork 172 has moved from its first mode position (FIG. 7) to its second mode position in response to rotation of sector plate 86. A high-range dwell section 92a of range slot 92 maintains follower 94 at the same axial location along shift rail 98 during rotation of sector plate 86 in the clockwise direction from the 4H-LOCK position to the 4H-AUTO position, thereby maintaining range collar 72 in its H position. With mode fork 172 in its second mode position, the tapered profile of high-range segment 182a of camming edge 182 acts to locate cam rod segment 170 in a second position such that ends 166 and 168 of drag band 164 now engage a thinner terminal end portion 170b of cam rod segment 170. Contraction of the distance between ends 166 and 168 of drag band 164 acts to re-engage the circumferential drag force exerted by drag band 164 on third rim 152 of actuator ring 138. Therefore, initial rotation of rear output shaft 18 and front output shaft 32 caused by motive operation of the vehicle results in circumferential indexing of actuator ring 138 relative to second sprocket 114 until lug 150 engages one of end surfaces 126 and 128 of actuation slot 125 in slipper ring 118.

For example, if the vehicle is rolling forward, second sprocket 114 would rotate counter clockwise (see FIG. 4) and the drag exerted by drag band 164 would cause actuator ring 138 to index in a clockwise direction until lug 150 engages end surface 128. In this position, lug 150 prevents rotation of slipper ring 118 in a first direction (i.e., counterclockwise) relative to outer ring 124 while permitting limited rotation of slipper ring 118 in a second direction (i.e., clockwise) relative to outer ring 124. Since outer ring 124 is driven by rear output shaft 18 via transfer assembly 56, and slipper ring 118 is mounted on front output shaft 32, mode clutch assembly 58 is maintained in an unlocked condition during relative rotation in the first direction and automatically locks in response to relative rotation in the second direction. Specifically, with lug 150 engaging end surface 128 of slipper ring 118 it acts to maintain alignment between slipper ring 118 and outer ring 124 with rollers 134 centrally located in cam tracks 130 and 132. As such, slipper ring 118 is not frictionally clamped to front output shaft 32 and front output shaft 32 is allowed to overrun rear output shaft 18.

However, if traction is lost at rear wheels 26 and rear output shaft 18 attempts to overrun front output shaft 32, slipper ring 118 moves in the second direction relative to outer ring 124. This limited relative rotation causes rollers 134 to ride up cam tracks 130 and 132 which acts to frictionally clamp slipper ring 118 to front output shaft 32, thereby locking mode clutch assembly 58 for transferring drive torque from rear output shaft 18 through transfer assembly 56 and mode clutch assembly 58 to front output shaft 32. This one-way locking function automatically establishes the on-demand four-wheel high-range drive mode during forward motion of the vehicle since front output shaft 32 is coupled for rotation with rear output shaft 18. However, once the traction loss condition has been eliminated, actuator ring 138 again indexes in a clockwise direction until lug 150 re-engages end surface 128 of slipper ring 118. Thus, mode clutch assembly 58 is released and automatically returns to operation in its unlocked mode. Namely, once the rear wheel slip has been eliminated, slipper ring 118 moves relative to outer ring 124 for again locating rollers 134 centrally in cam tracks 130 and 132 to disengage mode clutch assembly 58 until the next lost traction situation occurs.

During reverse motive operation of the vehicle in the on-demand four-wheel drive mode, second sprocket 114 would rotate clockwise (FIG. 4) and the drag force would cause actuator ring 138 to circumferentially index until lug 150 is located adjacent to end surface 126 of slipper ring 118. This arrangement is the reverse of that described for forward operation such that limited relative rotation is permitted between slipper ring 118 and outer ring 124 in the first direction but prevented in the second direction. Thus, operation in the on-demand four-wheel drive mode during reverse travel of the vehicle also permits front output shaft 32 to overrun rear output shat 18 during tight cornering while mode clutch assembly 58 locks to transfer drive torque to front output shaft 32 during lost traction at the rear wheels. As such, once the on-demand four-wheel high-range drive mode is established, it is operational during both forward and reverse travel of the vehicle. Thus, when transfer case 16 functions in its on-demand mode, it permits front drive shaft 44 to overrun rear drive shaft 30 with all drive torque delivered to rear driveline 20. Drive torque is only transferred to front driveline 34 through mode clutch assembly 58 when rear output shaft 18 attempts to overrun front output shaft 32.

When it is desired to shift transfer case 16 from its on-demand four-wheel high-range drive mode into its neutral mode, the mode signal from mode selector 46 is sent to controller 48 which then sends a control signal to electric motor 88 to rotate sector plate 86 clockwise until poppet assembly 188 is located in its N detent. Such rotation of sector plate 86 causes range follower 94 to exit high-range dwell section 92a of range slot 92 and travel within a shift section 92b thereof. The contour of shift section 92b causes range fork 76 to move axially which causes corresponding movement of range collar 72 from its H position to its N position. Concurrently, follower segment 180 of mode fork 172 exits high-range segment 182a of camming edge 182 and travels along a dwell segment 182b thereof which is contoured to maintain mode fork 172 in its second mode position.

When mode selector 46 indicates selection of the part-time four-wheel low-range drive mode, sector plate 86 is rotated until poppet assembly 188 is located in the 4L-LOCK detent. Assuming the shift sequence required continued rotation of sector plate 86 in the clockwise direction range follower 94 continues to travel within shift section 92b of range slot 92 which acts to axially move range collar 72 from its N position to its L position. Concurrently, mode follower segment 180 exits dwell segment 182b of camming edge 182 and travels along a low-range segment 182c which functions to move mode fork 172 from its second mode position into its first mode position. As previously described, locating mode fork 172 in its first mode position causes a bi-directional locking of mode clutch assembly 58 for establishing the part-time four-wheel low-range drive mode.

Upon selection of the on-demand four-wheel low-range drive mode, sector plate 86 is rotated by electric motor assembly 88 until poppet assembly 188 is located in its 4L-AUTO detent. Such rotation of sector plate 86 causes range follower 94 to travel within a low-range dwell section 92c of range slot 92 so as to maintain range collar 72 in its L position. Such rotation of sector plate 86 also causes follower segment 180 of mode fork 172 to ride against a cam segment 182d of camming edge 182 which forcibly urges mode fork 172 to move from its first position to its second mode position. Thus, the on-demand four-wheel low-range drive mode is established when range fork is in its L position and mode fork 172 is in its second mode position. The automatic operation of mode clutch assembly 58 described above in reference to the on-demand high-range drive mode is identical to that provided in the on-demand four-wheel low-range drive mode.

Figure 9:
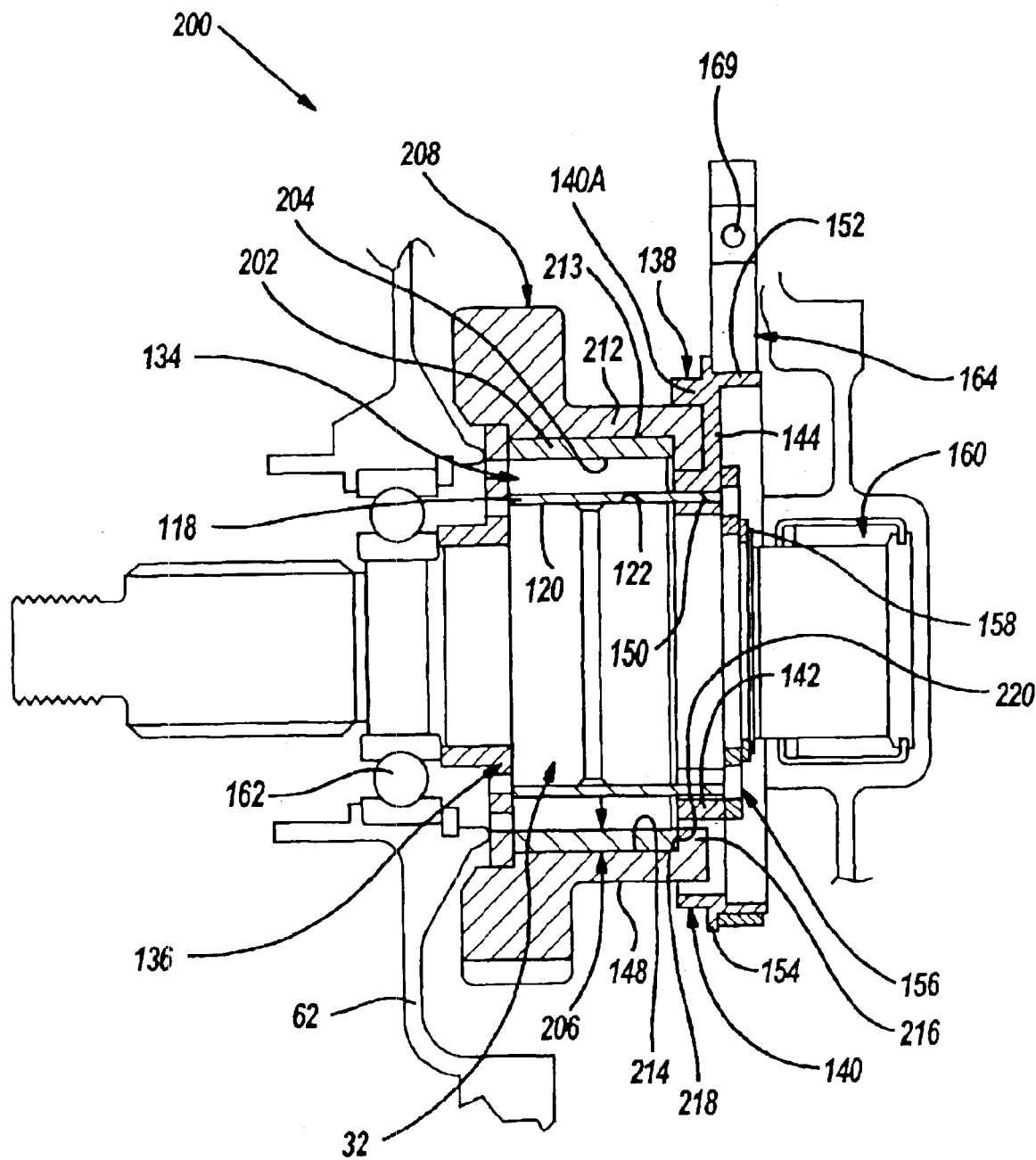
FIGS. 9 and 10 are sectional views illustrating alternative embodiments of the bi-directional overrunning clutch assembly in accordance with the present invention.

An alternate embodiment of a mode clutch assembly 200 is depicted in FIG. 9. Clutch assembly 200 functions substantially identically to clutch assembly 58 in that it is a controllable, multi-mode, bi-directional overrunning clutch. Additionally, clutch assembly 200 addresses the need for a cost effective design that may be used for a variety of traction control systems. To construct clutch assembly 58, as described in FIG. 2, special machining of outer ring 124 in second sprocket 114 is required to form arcuate cam tracks 132. In order to simplify machining of sprocket 114, clutch assembly 200 now incorporates a tubular sleeve, hereinafter referred to as intermediate ring 202, which includes a series of axially-extending arcuate cam tracks 204 formed on its inner surface. This tubular insert design allows for modular construction of a bi-directional overrunning clutch assembly that can be easily configured for use in different applications. Specifically, a number of differently sized shafts and sprockets may be interconnected via a standardized clutch assembly through the use of an intermediate ring 202 having a thickness 206 selected to account for different clearances between the sprocket and the shaft. As such, a set of intermediate rings 202 having different thicknesses can be used to drivingly interconnect a number of shafts and sprocket combinations, thereby reducing the overall cost of the product line.

As stated, clutch assembly 200 is substantially similar in structure and function to that of clutch assembly 58. As such, common elements will retain the reference numerals previously introduced. Furthermore, it should be appreciated that while clutch assembly 200 is depicted as selectively interconnecting a driven second sprocket 208 to front output shaft 32, clutch assembly 200 may, in the alternative, be positioned to selectively couple first sprocket 110 to rear output shaft 18, or to selectively couple any other pair of rotary components.

With continued reference to FIG. 9, clutch assembly 200 is shown to include an inner ring or slipper ring 0.118 having inner surface 120 concentrically mounted on outer surface 122 of front output shaft 32. Intermediate ring 202 is non-rotatably coupled to an outer ring 212. Outer ring 212 is preferably formed as an axial hub extension of second sprocket 208 and defines a cylindrical chamber within which intermediate ring 202 is disposed. Preferably, intermediate ring 202 is coupled to second sprocket 208 with a light interference fit between its cylindrical outer surface 213 and a cylindrical inner surface 214 of the chamber formed in second sprocket 208. If desired, the end of intermediate ring 202 can be secured to sprocket 208 via a secondary operation (i.e., welding, staking, etc.). In addition, the generally thin-walled construction of intermediate ring 202 will allow its surface 213 to expand and further engage inner surface 214 of second sprocket 208 when a radial separating force is generated by rollers 134 during locking actuation of clutch assembly 200. This feature eliminates the need for a torque driving mechanism such as, for example, a spline or a key to be used to secure intermediate ring 202 to outer ring 212.

Furthermore, it should be appreciated that the modular intermediate ring and sprocket design permits the use of minimally complex machining processes to provide consistent size, shape and location of cam tracks 204. Intermediate ring 202 may be formed using common processes such as finish turning of a blank or a bar. For example, a die-set cam broaching process with a wafer type expandable mandrel can be performed prior to heat treatment to form the inner cam tracks in intermediate ring 202. Hardening is achieved by induction heat treatment and die quenching. Grinding or hard turning may be used to finish the outside diameter of intermediate ring 202 to maintain or establish alignment with the internal cam tracks.

As noted, second sprocket 208 is manufactured with a smooth cylindrical inner surface 214. This design permits standard machining and finishing processes to be utilized. If desirable, a radially inwardly extending lip 216 can be formed to provide a seat 218 for an end surface 220 of intermediate ring 202. During assembly, intermediate ring 202 is located via a positive stop when end surface 220 engages seat 218. The remaining components not specifically described in relation to clutch assembly 200 function substantially similarly to the components of clutch assembly 58.

Figure 10:
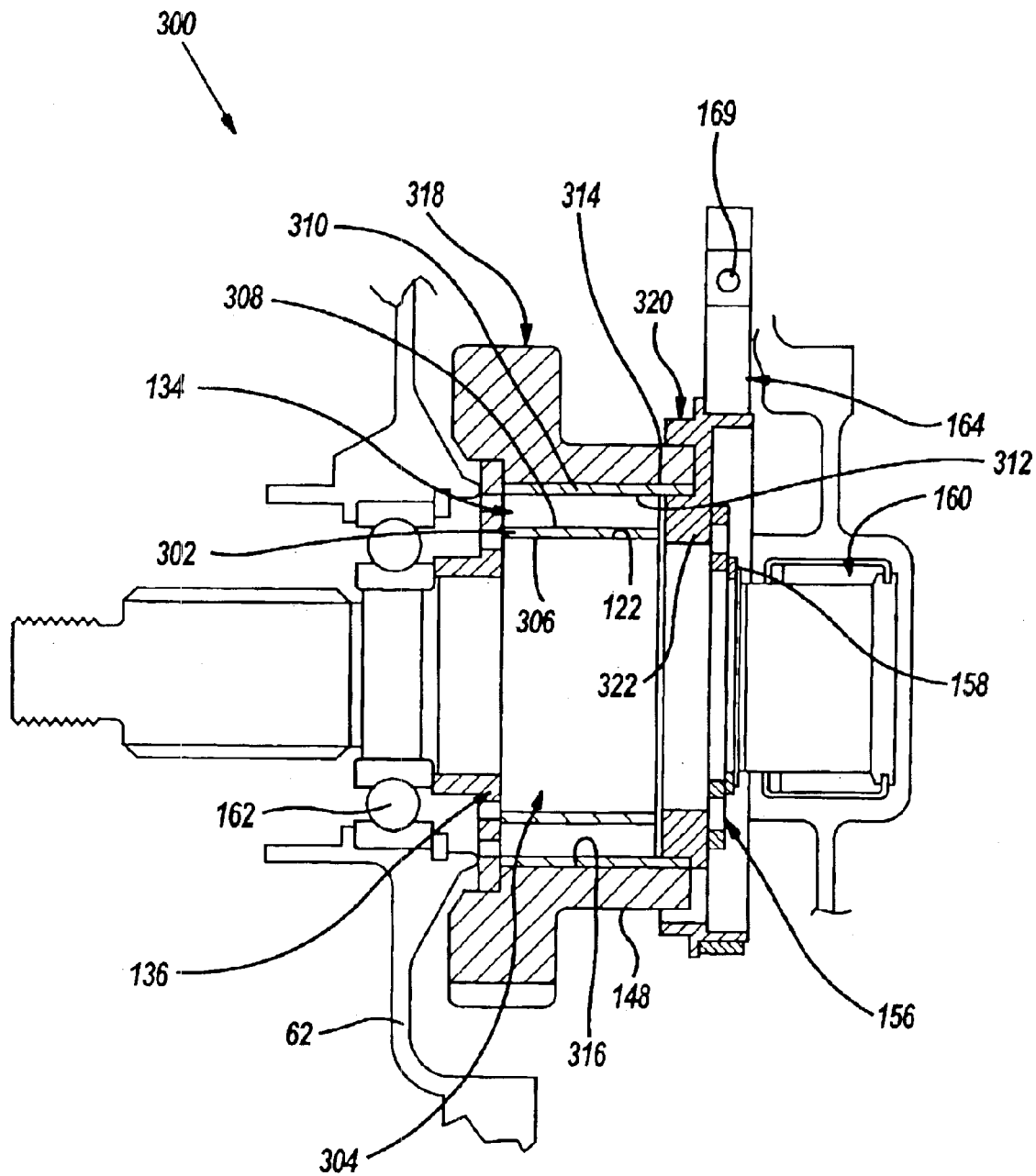

FIG. 10 depicts another alternate mode clutch assembly 300. Clutch assembly 300 is substantially similar to clutch assembly 200 except that a tubular sleeve, referred to as intermediate ring 302, is non-rotatably coupled to a front output shaft 304. Intermediate ring 302 includes a substantially smooth cylindrical inner surface 306 and an outer surface formed to include a plurality of axially-extending arcuate cam tracks 308. Inner surface 306 is secured via a light press fit to cylindrical outer surface 122 of front output shaft 32. In addition, a slipper ring 310 is provided which has an inner surface formed to include a corresponding plurality of axially-extending arcuate cam tracks 312. Cylindrical rollers 134 are retained within aligned cam tracks 308 and 312. Upon locking of mode clutch assembly 300, an outer surface 314 of slipper ring 310 is frictionally engaged with an inner surface 316 of a driven second sprocket 318.

An actuator ring 320 is provided includes a radial lug 322. Slipper 310 is a split ring having an actuation slot (not shown). Lug 322 is positioned within the actuation slot. Therefore, clutch assembly 300 may be actuated by controlling rotation of actuator ring 320 relative to slipper ring 310, thereby causing slipper ring 310 to rotate relative to intermediate ring 302. Based on the geometry of cam tracks 308, 312 and rollers 134, slipper ring 310 will frictionally engage inner surface 316 of second sprocket 318 upon selective rotation of actuator ring 320.

The present invention provides an efficient arrangement for shifting a multi-mode bi-directional clutch assembly in a power transfer unit, such as a four-wheel drive transfer case.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a bi-directional overrunning clutch having a first ring non-rotatably coupled to one of said rotary input member and said rotary output member, a second ring spaced apart from the other of said rotary input member and said rotary output member and rollers disposed in aligned cam tracks formed in facing surfaces of said first and second rings, said second ring adapted to circumferentially index relative to said first ring to cause said rollers to ride up said cam tracks and cause said second ring to frictionally engage the other of said rotary input member and said rotary output member.

2. The power transmission device of claim 1 wherein said rotary input member includes a substantially cylindrical bore, and wherein said first ring has an outer surface engaging said bore and an inner surface on which said cam tracks are formed.

3. The power transmission device of claim 2 wherein said first ring includes a thickness between its outer surface and its inner surface, and wherein said thickness is varied to account for varied spacing between said bore and said rotary output member.

4. The power transmission device of claim 3 wherein said rotary input member includes an annular lip inwardly protruding from said bore, and wherein said first ring includes an end face engaging said lip.

5. The power transmission device of claim 1 wherein said second ring is a split ring defining an actuation slot having first and second edge surfaces, said power transmission device further including an actuator ring having a lug retained in said actuation slot of said split ring and which is moveable from a central position disengaged from said first and second edge surfaces in a first direction into engagement with said first edge surface and in a second direction into engagement with said second edge surface.

6. The power transmission device of claim 5 wherein said actuator ring has a rim on which a drag band is retained, said drag band having a pair of ends between which a cam member is retained, said cam member having a first segment operable to cause said drag band to exert a drag force on said rim of said actuation ring which causes circumferential indexing of said actuator ring in response to relative rotation between said firs and second rings, said cam member further including a second segment operable to release said drag force from said actuation ring.

7. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a bi-directional overrunning mode clutch having a first ring driven by said rotary input member, a second ring non-rotatably coupled to said first ring, a third ring positioned on said rotary output member and rollers disposed in aligned cam tracks formed in facing surfaces of said second and third rings, said third ring adapted to circumferentially index relative to said second ring to cause said rollers to ride up said cam tracks and cause said third ring to frictionally engage said rotary output member, and a mode actuator that is moveable between a first position and a second position to establish corresponding AUTO and LOCK modes, said overrunning clutch being operable in its AUTO mode to permit relative rotation between said rotary input member and said rotary output member in a first direction and prevent relative rotation therebetween in a second direction, and said overrunning clutch being operable in its LOCK mode to prevent relative rotation between said rotary input member and said rotary output member in both directions.

8. The power transmission device of claim 7 wherein said third ring includes an actuation slot having first and second edge surfaces, and wherein said mode actuator is an actuator ring having a lug retained in said actuation slot of said third ring and which is moveable from a central position disengaged from said first and second edge surfaces in a first direction into engagement with said first edge surface and in a second direction into engagement with said second edge surface.

9. The power transmission device of claim 8 wherein said actuator ring has a rim on which a drag band is retained, said drag band having a pair of ends between which a cam member is retained, said cam member having a first segment operable to cause said drag band to exert a drag force on said rim of said actuation ring which causes circumferential indexing of said actuator ring in response to relative rotation between said second and third rings, said cam member further including a second segment operable to release said drag force from said actuation ring.

10. The power transmission device of claim 7 wherein said first ring includes a substantially cylindrical bore, and wherein said second ring has an outer surface engaging said bore and an inner surface on which said cam tracks are formed.

11. The power transmission device of claim 10 wherein said second ring has a thickness defined between its inner and outer surfaces and wherein said thickness is varied to account for varied spacing between said bore and said rotary output member.

12. The power transmission device of claim 11 wherein said first ring includes an annular lip protruding from said bore and said second ring includes an end surface engaging said lip.

13. A power transmission device comprising:
a rotary input member adapted to receive drive torque from a source of torque;
a rotary output member adapted to provide drive torque to an output device; and
a bi-directional overrunning clutch operable for transferring drive torque from said input member to said output member, said bi-directional overrunning clutch including a first ring driven by said rotary output member, a second ring non-rotatably coupled to said rotary input member, a third ring positioned between said first ring and said second ring and rollers disposed in aligned cam tracks formed in facing surfaces of said second and third rings, said third ring adapted to circumferentially index relative to said second ring to cause said rollers to ride up said cam tracks and cause said third ring to frictionally engage said first ring.

14. The power transmission device of claim 13 further including an actuator for controlling rotational movement of said third ring relative to said second ring.

15. The power transmission device of claim 14 wherein the actuator is moveable between a first position and a second position to establish corresponding AUTO and LOCK modes, said power transmission device being operable in its AUTO mode to permit relative rotation between said rotary input member and said rotary output member in a first direction and prevent relative rotation therebetween in a second direction, and said power transmission device being operable in its LOCK mode to prevent relative rotation between said rotary input member and said rotary output member in both directions.

16. The power transmission device of claim 15 wherein said power transmission device is a transfer case with said rotary input member being a first output shaft and said rotary output member being a second output shaft.

17. A power transmission device comprising:
- a rotary input member adapted to receive drive torque from a source of torque;
- a rotary output member adapted to provide drive torque to an output device; and
- a bi-directional overrunning clutch operable for transferring drive torque from said input member to said output member, said bi-directional overrunning clutch having a first ring driven by said rotary input member, a second ring driven by said first ring, a third ring positioned on said rotary output member, and rollers disposed in aligned cam tracks formed in facing surfaces of said second and third rings, said third ring adapted to circumferentially index relative to said second ring to cause said rollers to ride up said cam tracks and cause said third ring to frictionally engage said rotary output member.

18. The power transmission device of claim 17 wherein said first ring includes a substantially cylindrical bore, and wherein said second ring has an outer surface engaging said bore and an inner surface on which said cam tracks are formed.

19. The power transmission device of claim 17 further including an actuator for controlling indexing of said third ring relative to said second ring.

20. The power transmission device of claim 19 wherein said actuator is moveable between a first position and a second position to establish corresponding AUTO and LOCK modes, said overrunning clutch is operable in its AUTO mode to permit relative rotation between said rotary input member and said rotary output member in a first direction and prevent relative rotation therebetween in a second direction, and said overrunning clutch is operable in its LOCK mode to prevent relative rotation between said rotary input member and said rotary output member in both directions.

21. The power transmission device of claim 20 wherein said third ring includes an actuation slot having first and second edge surfaces, and wherein said actuator is an actuator ring having a lug retained in said actuation slot of said third ring and which is moveable from a central position disengaged from said first and second edge surfaces in a first direction into engagement with said first edge surface and in a second direction into engagement with said second edge surface.

22. A power transmission device comprising:
- a rotary input member adapted to receive drive torque from a source of torque;
- a rotary output member adapted to provide drive torque to an output device; and
- a bi-directional overrunning clutch operable for transferring drive torque from said input member to said output member, said bi-directional overrunning clutch including a first ring driven by said rotary input member, a second ring driven by said rotary output member, a third ring positioned between said first ring and said second ring, and rollers disposed in aligned cam tracks formed in facing surfaces of said second and third rings, said third ring is adapted to circumferentially index relative to said second ring to cause said rollers to ride up said cam tracks and cause said third ring to frictionally engage said first ring.

23. The power transmission device of claim 22 further including an actuator for controlling indexing of said third ring relative to said second ring.

24. The power transmission device of claim 23 wherein said actuator is moveable between a first position and a second position to establish corresponding AUTO and LOCK modes, said bi-directional overrunning clutch is operable in its AUTO mode to permit relative rotation between said rotary input member and said rotary output member in a first direction and prevent relative rotation therebetween in a second direction, and said bi-directional overrunning clutch is operable in its LOCK mode to prevent relative rotation between said rotary input member and said rotary output member in both directions.

25. A power transmission device of claim 24 wherein said power transmission device is a transfer case with said rotary input member being a first output shaft and said rotary output member being a second output shaft.

26. A power transmission device comprising:
- a rotary input member adapted to receive drive torque from a source of drive torque:
- a rotary output member adapted to transmit drive torque to an output device; and
- a mode clutch for selectively transferring drive torque from said input member to said output member, said mode clutch including a first ring driven by said input member and defining an aperture, a second ring retained in said aperture for common rotation with said first ring, a third ring rotatably supported on said output member, and rollers disposed in aligned cam tracks formed in facing surfaces of said second and third rings, and wherein said third ring is adapted to circumferentially index relative to said second ring to cause said rollers to ride along said cam tracks and cause said third ring to frictionally engage said output member.

27. A power transmission device comprising:
- a rotary input member adapted to receive drive torque from a source of torque;
- a rotary output member adapted to transmit drive torque to an output device; and
- a mode clutch for selectively transmitting drive torque from said input member to said output member, said mode clutch including a first ring driven by one of said input member and said output member and defining an aperture, a second ring coupled for rotation with the other of said input member and said output member, a third ring disposed in said aperture, and rollers disposed in aligned cam tracks formed in facing surfaces of said second and third rings, said third ring is adapted to circumferentially index relative to said second ring to cause said rollers to ride along said cam tracks and cause said third ring to frictionally engage said first ring.

28. A transfer case for transferring drive torque from a powertrain to first and second drivelines of a motor vehicle, said transfer case comprising:
- a first shaft adapted to transfer drive torque from the powertrain to the first driveline;
- a second shaft adapted for connection to the second driveline;
- a transfer assembly including a first sprocket driven by said first shaft, a second sprocket surrounding said second shaft, and a drive mechanism interconnecting said second sprocket to said first sprocket; and
- a mode clutch for selectively coupling said second shaft for rotation with said second sprocket, said mode clutch including a first ring having an outer surface engaging an inner surface of said second sprocket and an inner surface with first cam surfaces, a second ring having an inner surface mounted on an outer surface of said second shaft and an outer surface with second cam surfaces, and rollers disposed between aligned sets of said first and second cam surfaces, said second ring adapted to circumferentially index relative to said first ring to cause said rollers to ride up said cam surfaces and cause said inner surface of said second ring to frictionally engage said outer surface of said second shaft.

29. The transfer case of claim 28 further comprising:

an actuator that is moveable between first and second positions to establish corresponding AUTO and LOCK modes for said mode clutch, said mode clutch is operable in its AUTO mode to permit relative rotation between said first and second shafts in a first direction and prevent relative rotation therebetween in a second direction, and said mode clutch is operable in its LOCK mode to prevent relative rotation between said firs and second shafts in both directions; and a shift mechanism for moving said actuator between its first and second positions.

30. A transfer case for transferring drive torque from a powertrain to first and second drivelines of a motor vehicle, said transfer case comprising:

a first shaft adapted to transfer drive torque from the powertrain to the first driveline;

a second shaft adapted for connection to the second driveline;

a transfer assembly including a first sprocket surrounding said first shaft, a second sprocket fixed to said second shaft, and a drive mechanism interconnecting said first sprocket to said second sprocket; and a mode clutch for selectively coupling said first sprocket for rotation with said first shaft, said mode clutch including a first ring having an outer surface engaging an inner surface of said first sprocket and an inner surface with first cam surfaces, a second ring having an inner surface mounted on an outer surface of said first shaft and an outer surface with second cam surfaces, and rollers disposed between aligned sets of said first and second cam surfaces, said second ring adapted to circumferentially index relative to said first ring to cause said rollers to ride up said cam surfaces and cause said inner surface of said second ring to frictionally engage said outer surface of said first shaft.

31. The transfer case of claim 30 further comprising:

an actuator that is moveable between first and second positions to establish corresponding AUTO and LOCK modes for said mode clutch, said mode clutch is operable in its AUTO mode to permit relative rotation between said first and second shafts in a first direction and prevent relative rotation therebetween in a second direction, and said mode clutch is operable in its LOCK mode to prevent relative rotation between said firs and second shafts in both directions; and a shift mechanism for moving said actuator between its first and second positions.

32. A transfer case for transferring drive torque from a powertrain to first and second drivelines of a motor vehicle, said transfer case comprising:

a first shaft adapted to transfer drive torque from the powertrain to the first driveline;

a second shaft adapted for connection to the second driveline;

a transfer assembly including a first sprocket driven by said first shaft, a second sprocket surrounding said second shaft, and a drive mechanism interconnecting said second sprocket to said first sprocket; and a mode clutch for selectively coupling said second shaft for rotation with said second sprocket, said mode clutch including a first ring having an outer surface engageable with an inner surface of said second sprocket and an inner surface with first cam surfaces, a second ring having an inner surface secured to an outer surface of said second output shaft and an outer surface with second cam surfaces, and rollers disposed between aligned sets of said first and second cam surfaces, said first ring adapted to circumferentially index relative to said second ring to cause said rollers to ride up said cam surfaces and cause said outer surface of said first ring to frictionally engage said inner surface of said second sprocket.

33. The transfer case of claim 32 further comprising:

an actuator that is moveable between first and second positions to establish corresponding AUTO and LOCK modes for said mode clutch, said mode clutch is operable in its AUTO mode to permit relative rotation between said first and second shafts in a first direction and prevent relative rotation therebetween in a second direction, and said mode clutch is operable in its LOCK mode to prevent relative rotation between said first and second shafts in both directions; and a shift mechanism for moving said actuator between its first and second positions.

34. A transfer case for transferring drive torque from a powertrain to first and second drivelines of a motor vehicle, said transfer case comprising:

a first shaft adapted to transfer drive torque from the powertrain to the first driveline;

a second shaft adapted for connection to the second driveline;

a transfer assembly including a first sprocket surrounding said first shaft, a second sprocket fixed to said second shaft, and a drive mechanism interconnecting said second sprocket to said first sprocket; and a mode clutch for selectively coupling said first sprocket for rotation with said first shaft, said mode clutch including a first ring having an outer surface engageable with an inner surface of said first second sprocket and an inner surface with first cam surfaces, a second ring having an inner surface secured to an outer surface of said second output shaft and an outer surface having second cam surfaces, and rollers disposed between aligned sets of said first and second cam surfaces, said first ring adapted to circumferentially index relative to said second ring to cause said rollers to ride up said cam surfaces and cause said outer surface of said first ring to frictionally engage said inner surface of said first sprocket.

35. The transfer case of claim 34 further comprising:

an actuator that is moveable between first and second positions to establish corresponding AUTO and LOCK modes for said mode clutch, said mode clutch is operable in its AUTO mode to permit relative rotation between said first and second shafts in a first direction and prevent relative rotation therebetween in a second direction, and said mode clutch is operable in its LOCK mode to prevent relative rotation between said first and second shafts in both directions; and a shift mechanism for moving said actuator between its first and second positions.

* * * * *